United States Patent
Boehl et al.

(10) Patent No.: US 7,812,744 B2
(45) Date of Patent: Oct. 12, 2010

(54) METHOD FOR ERROR HANDLING

(75) Inventors: Eberhard Boehl, Reutlingen (DE); Michael Boehl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 11/886,198

(22) PCT Filed: Mar. 8, 2006

(86) PCT No.: PCT/EP2006/060556

§ 371 (c)(1),
(2), (4) Date: Oct. 2, 2009

(87) PCT Pub. No.: WO2006/097422

PCT Pub. Date: Sep. 21, 2006

(65) Prior Publication Data

US 2010/0013683 A1    Jan. 21, 2010

(30) Foreign Application Priority Data

Mar. 16, 2005  (DE) ........................ 10 2005 012 069

(51) Int. Cl.
*H03M 7/00* (2006.01)

(52) U.S. Cl. .............................. 341/59; 341/58; 341/94; 714/755; 714/758; 714/766; 714/780; 714/800

(58) Field of Classification Search ................... 341/58, 341/59, 94; 714/755, 758, 766, 776, 784, 714/780, 800
See application file for complete search history.

(56) References Cited

U.S. PATENT DOCUMENTS

| | | | | |
|---|---|---|---|---|
| 5,442,647 | A * | 8/1995 | Loebig | 714/807 |
| 5,938,790 | A * | 8/1999 | Marrow | 714/795 |
| 6,198,413 | B1 * | 3/2001 | Widmer | 341/59 |
| 6,604,219 | B1 * | 8/2003 | Lee et al. | 714/769 |
| 6,778,105 | B2 * | 8/2004 | Suh et al. | 341/59 |
| 6,909,385 | B2 * | 6/2005 | Vasic et al. | 341/102 |
| 7,002,492 | B2 * | 2/2006 | Tsang et al. | 341/58 |
| 7,281,190 | B2 * | 10/2007 | Souvignier et al. | 714/755 |
| 7,460,034 | B2 * | 12/2008 | Boehl et al. | 341/58 |
| 2005/0040976 | A1 * | 2/2005 | Tsang | 341/59 |
| 2007/0050674 | A1 * | 3/2007 | Park et al. | 714/31 |
| 2007/0234174 | A1 * | 10/2007 | Boehl et al. | 714/752 |
| 2008/0163033 | A1 * | 7/2008 | Yim | 714/785 |

* cited by examiner

*Primary Examiner*—Linh V Nguyen
(74) *Attorney, Agent, or Firm*—Kenyon & Kenyon LLP

(57) ABSTRACT

In a method for error handling in transmission of a datum over a communications system, at least two data words consisting of bits are generated for the datum in accordance with a predefined coding rule, and one of the generated data words is selected taking into consideration a running digital sum formed over the corresponding data word, and the running digital sum of the selected data word is used for the formation of a first running digital sum. The selected data word is converted into a code data word, and a bit of the data word is in each case assigned a two-bit string with two different single-bit values. The code data word and the first running digital sum are transmitted. The received code data word is examined to ascertain whether an erroneous two-bit string exists, in which case the error is corrected using the first running digital sum.

10 Claims, 1 Drawing Sheet

METHOD FOR ERROR HANDLING

BACKGROUND OF THE INVENTION

1. Field of the Invention

The present invention relates to a method and a system for error handling in transmission of a datum.

2. Description of Related Art

In a known method for error handling in transmission of coded data over a communications system, a data word is selected for the data in accordance with a predefinable coding rule, the data being represented as bits which may assume two different values, ones and zeros. Provision is made in that case for at least one running digital sum (RDS) to be formed in such a manner that a summed difference of a total number of the ones and a total number of the zeros is formed at least over the data word, and that running digital sum is transmitted preferably periodically after a given number of transmitted data words. Furthermore, the running digital sum is re-calculated and periodically compared in a receiver on the basis of the data words transmitted. In the event of any deviation which may occur, it is possible to recognize an error.

A BRIEF SUMMARY OF THE INVENTION

The method according to the present invention provides for error handling in transmission of a datum over a communications system, which method enables recognition and correction of single-bit errors. In a first step, at least two data words consisting of bits are generated for the datum in accordance with a predefined coding rule. The data words thus generated represent the at least one datum in a character string that may have two clearly distinguishable bit values, for example zeros and ones.

It is provided that, for each of those data words, in a second step a running digital sum (RDS) is calculated. To calculate a running digital sum it may be provided that a first sum is formed by way of a total number of the first of the two possible bit values, for example the one, within the data word and a second sum is formed by way of a total number of the second of the two possible bit values, for example the zero, within that data word and a difference between those two sums is calculated. The difference thus provides information on a frequency of the two different bit values within the data word.

Taking into consideration the running digital sums of the data words generated for the datum, a data word is selected. A first running digital sum corresponds in this case to the running digital sum formed over the selected data word or it is calculated by addition of the running digital sum of the selected data word to a currently given running digital sum. The data word may be selected on the basis that the first running digital sum becomes as small as possible in magnitude. In a third step, the selected data word is converted by a modulation method into a code data word. In that operation, a bit of the data word is in each case assigned a two-bit string with two different bit values. The code data word thus provided accordingly has twice as many characters as the selected data word. The different bit values of the code data word may similarly be zeros and ones. Depending on the nature of the modulation method, a two-bit string of the code data word has the two possible bit strings "10" or "01".

In a further step, the code data word and the first running digital sum are transmitted, for example periodically. Such a transmission is carried out between individual stations connected to one another via the communications system. In this operation, a first station configured as a transmitter may transmit the running digital sum and the code data word to at least one second station configured as a receiver.

In a subsequent step of the method, the code data word received by the at least one second station is examined to ascertain whether it has a two-bit string with two identical bit values, for example two zeros or two ones. If that were to be the case, one bit of the code data word within a two-bit string would have been corrupted during the transmission. Thus, it is possible to identify an erroneous two-bit string. That erroneous two-bit string may be corrected using or with the aid of the first running digital sum.

In one possible embodiment of the method, it is provided that the data word for the datum is selected from two possible data words. For that purpose, the datum is assigned, in accordance with the predefined coding rule, a first data word and a second data word, these two data words each being the inverse of the other. This means that a bit at one position of the first data word is assigned a first of two possible bit values, and a corresponding bit at the same position of the second data word is assigned a second of two possible bit values. Whether the first or the second data word is selected may be determined by a specific condition, such as, for example, that the first running digital sum is to have as small a magnitude as possible. The first running digital sum may in this case directly correspond to the running digital sum of the data word to be selected or to the sum of that running digital sum of the selected data word with a currently given running digital sum. A value for the currently given running digital sum depends, for example, on a running digital sum of at least one predecessor data word of the data word to be selected.

In accordance with a further embodiment of the method, each code data word received is converted, by a demodulation method corresponding to the modulation method, that is, the reverse modulation method, in the event of the occurrence of an erroneous two-bit string into at least two data words. For these data words provided in that manner, a second digital sum is calculated in each case. The calculation of the second running digital sum is carried out in accordance with the calculation of the first running digital sum. The respective second running digital sum may accordingly, for example, correspond to the running digital sum of the respective demodulated data words or be formed from the sum of the respective running digital sum and a currently given running digital sum. On comparison of the respective second running digital sums with the received first running digital sum, the error may be corrected, since the second running digital sum corresponds to the first running digital sum for precisely only one of the data words. Thus, it is possible for an original datum to be reconstructed in a clear-cut manner.

If one assumes, for example, that only one bit in the code data word has been corrupted, on the basis of the modulation method, according to which a two-bit string is "01" or "10", it is immediately clear that a received two-bit string is either "00" or "11". With the aid of the above-mentioned coding rule and the first running digital sum a correction is made; the erroneous two-bit string is assigned the correct two-bit string "10" or "01".

Whether a two-bit string within the code data word has a single-bit error may accordingly be determined solely on the basis of a string of bit values, that is to say, on the basis of the structure of the data word. Which of the two single bits within that two-bit string is erroneous may be established by comparison of the first with the second running digital sum. On the basis of the running digital sum it is known how often the first of the two bit values and how often the second of the two bit values occurs within the data word.

In principle, the datum itself may be coded into bit values which, in conjunction with the coding rule and the running digital sum (RDS), make error recognition possible. This is particularly the case when a number of different data words m is smaller than a variant number $2^n$ of possible code data words with n bits.

The method may also be carried out for a group of data. In that instance, it is conceivable for two data words to be generated for each datum of the group. Which of those two data words will in each case be selected for further processing for the datum may in turn depend on a value of the first running digital sum. The first running digital sum may be so calculated that it is obtained as the sum over all running digital sums of all data words to be selected of the group and, for example, is to be as small as possible in magnitude. The data word for a datum is selected, for example, in dependence on the currently given running digital sum between the two data words available for selection. In this case, the currently given running digital sum corresponds to an intermediate value for the first running digital sum calculated for the data words so far selected within the group. Thus, it is possible to cause the running digital sum to become, over the group of data words, on average as far as possible zero. That measure allows a substantially dc-free code to be obtained.

Using the method according to the present invention, it is possible to discover single-bit errors. With information about an error position, correction of hitherto-ambiguous errors that do not permit any clear-cut attribution of an error to a single bit is possible.

One possible modulation method for providing the code data word which is based on the data word is a so-called DPSK (differential phase shift keying) method. In this method, one bit of the data word is in each case modulated by the DPSK method with a carrier frequency for the data to be transmitted within the communications system. The DPSK method provides a phase jump of the carrier frequency in dependence on the data to be transmitted. Each data word is assigned two different DPSK code values. Accordingly, that two-bit string consists of either the bit values "10" or "01". A respective string of these two possible single bits depends on the bit value of the respective code word bit to be modulated or assigned.

For possible implementation of a suitable modulation of the data word, two different DPSK methods will be presented. In the case of modulation performed using the DPSK method, each individual bit of the data word is represented in two parts of differing level which may be represented, for example, by zeros and ones. Thus, transmission of the data or data words with a constant frequency signal is possible.

In a first DPSK method, which is also referred to as the original DPSK method, the data word is modulated by performing a phase jump of a constant frequency signal of the carrier frequency in dependence on the data word bit to be transmitted, wherein a bit string of the code data word to be provided in that case is not changed if the following bit value of the data word is a first of two possible bit values, for example zero, and wherein the bit string is inverted if the following bit value of the data word is a second of two possible bit values, for example a one.

Instead of transmitting merely the two possible bit values of the data word, it is always the carrier frequency, a "10" string, whether inverted or non-inverted, that is transmitted. As long as a bit value within the data word is a zero, the bit string is adopted unchanged from the preceding bit string. If the next bit value within the data word is a one, the sequence of the bit values is inverted, for example a "10" string is inverted to give a "01" string and vice versa. This may be represented by a generation rule. That generation rule contains an EXOR operation (antivalence), which is represented here by the # symbol, between the carrier frequency T(t) and a stored binary value B(t) at time t. Let the stored binary value be at the beginning for t=0 B(t)=0. D(t) denotes a bit value of a bit string of the data word. M(t) denotes a modulated signal. The stored binary value is changed with every change in the bit values within the data word:

$B(t+1)=B(t)\#(D(t)\#D(t+1))$ and $M(t+1)=B(t+1)\#T(t+1)$ or $M(t)=B(t)\#T(t)$.

A characteristic of the signal thus modulated, or of the code data word thereby provided, is that in the case of a two-bit string, assigned to one bit of the data word, within the code data word a switch must always take place in the middle, so that only the two-bit strings "10" or "01" are possible.

Alternatively, it is possible for a second DPSK method, which is also referred to as a modified DPSK method or PSK method, to be used as a modulation method for converting the data word into the code data word. One of the two possible bit values of the data word is in each case assigned one of the two possible two-bit strings of the code data word. In this case, the bit of the data word is assigned a first of two possible two-bit strings if the bit to be modulated has a first of two possible bit values within the code data word. If the data word bit to be modulated has a second of two possible bit values, it is assigned within the code data word a second of the two possible two-bit strings.

This may mean that the bit value "0" of the data word is assigned the two-bit string "10" and the bit value "1" is assigned the two-bit string "01". A converse, inverted assignment rule is also conceivable. That procedure may also be represented by a generation rule in which an EXOR operation between the carrier frequency and one bit of the data word in each case is taken into consideration:

$M(t)=D(t)\#T(t)$.

Here also, a characteristic of the modulated signal resides in its always being necessary for a switch, "10" or "01", to take place in the middle of a two-bit value assigned to a bit of the data word.

Table 1 shows, by reference to an example, in a first line the time t. D(t), in the second line, denotes a predefined bit value of a bit string of a data word. In a third and fourth line, the carrier frequency T(t) and a binary value B(t), respectively, at the time t are noted. $M(t)_{ORIG}$ in the fifth line shows values of the code data word generated by the original DPSK method. $M(t)_{MOD}$ in the sixth line shows values for a data word generated by the modified DPSK method.

TABLE 1

| t | 1 | 2 | 3 | 4 | 5 | 6 | 7 | 8 | 9 | 10 | 11 | 12 | 13 | 14 |
|---|---|---|---|---|---|---|---|---|---|----|----|----|----|----|
| D(t) | 0 | 1 | 0 | 0 | 1 | 1 | 1 | 0 | 0 | 1 | 1 | 0 | 0 | 0 |
| T(t) | 0 1 | 0 1 | 0 1 | 0 1 | 0 1 | 0 1 | 0 1 | 0 1 | 0 1 | 0 1 | 0 1 | 0 1 | 0 1 | 0 1 |
| B(t) | 0 0 | 1 1 | 1 1 | 1 1 | 0 0 | 1 1 | 0 0 | 0 0 | 0 0 | 1 1 | 0 0 | 0 0 | 0 0 | 0 0 |

TABLE 1-continued

| t | 1 | | 2 | | 3 | | 4 | | 5 | | 6 | | 7 | | 8 | | 9 | | 10 | | 11 | | 12 | | 13 | | 14 | |
|---|---|---|---|---|---|---|---|---|---|---|---|---|---|---|---|---|---|---|----|---|----|---|----|---|----|---|----|---|
| M(t) orig | 0 | 1 | 1 | 0 | 1 | 0 | 1 | 0 | 0 | 1 | 1 | 0 | 0 | 1 | 0 | 1 | 0 | 1 | 1 | 0 | 0 | 1 | 0 | 1 | 0 | 1 | 0 | 1 |
| M(t) mod  | 0 | 1 | 1 | 0 | 0 | 1 | 0 | 1 | 1 | 0 | 1 | 0 | 1 | 0 | 0 | 1 | 0 | 1 | 1 | 0 | 1 | 0 | 0 | 1 | 0 | 1 | 0 | 1 |

By using the two possible DPSK methods a clear-cut structure is imposed on the transmitted code data word, so that each two-bit string within the code data word consists of two different single-bit values. If a single-bit value were to be corrupted during the transmission, a two-bit string consisting of two identical single-bit values, either "00" or "11" would result. Thus, an erroneous two-bit string within the code data word is identifiable in a clear-cut manner.

The system according to the present invention is configured to carry out error handling for a datum to be transmitted between at least two stations. The system has a first and at least one second station.

In this system, a first station is configured to generate for the datum, in accordance with a predefinable coding rule, at least two data words consisting of bits. In this instance, depending on the value of a running digital sum formed over the data words in each case, one of the two code data words, which corresponds to the same datum, is selected.

In addition, the first station calculates a first running digital sum (RDS). The latter may, for example, correspond to the running digital sum of the selected data word or may be formed by adding the running digital sum of the selected data word to a currently given running digital sum. The selected data word is converted by the first station into a code data word, wherein a bit of the data word is in each case to be assigned a two-bit string with two different bit values. The first station transmits the code data word and the first running digital sum to the at least one second station.

In one possible embodiment, for calculation of the first running digital sum in the case of a plurality of data words of a group, all running digital sums of the plurality of data words are to be added up to a total value giving the first running digital sum. The group with the code data words resulting from the data words is referred to as a data frame. The first running digital sum for all data words of the group belonging to the data frame is transmitted by the first station to at least one second station within the system preferably periodically after that data frame.

The at least one second station examines a received code data word to ascertain whether it has a two-bit string with two identical bit values. If that is the case, the two-bit string with the two identical single-bit values has been transmitted between the stations of the system incorrectly.

Taking the first running digital sum into consideration, a single bit of the code data word having a single error may be identified and corrected. If a two-bit string has an error, it appears as a sequence of identical single-bit values, either as "00" or as "11". Such an erroneous two-bit string may have corresponded to the originally error-free two-bit string "01" or "10". On demodulation, there are accordingly obtained two alternative demodulated data words of which precisely one may be identified, on the basis of its respective running digital sum, as the data word originally to be transmitted.

The computer program according to the present invention having program code means is provided to perform all the steps of the method according to the present invention when the computer program is executed on a computer or a corresponding computational unit, e.g., in the system according to the present invention or in a computational unit within the system according to the present invention.

The computer program product according to the present invention having program code means that are stored on a computer-readable data medium is provided to perform all the steps of the method according to the present invention when the computer program is executed on a computer or a corresponding computational unit, e.g., on the system according to the present invention or a computational unit in the system according to the present invention.

It will be appreciated that the features mentioned hereinbefore and the features described hereinafter may be used not only in the combination given in each case but also in other combinations or individually, without departing from the scope of the present invention.

DETAILED DESCRIPTION OF THE INVENTION

Figure 1:
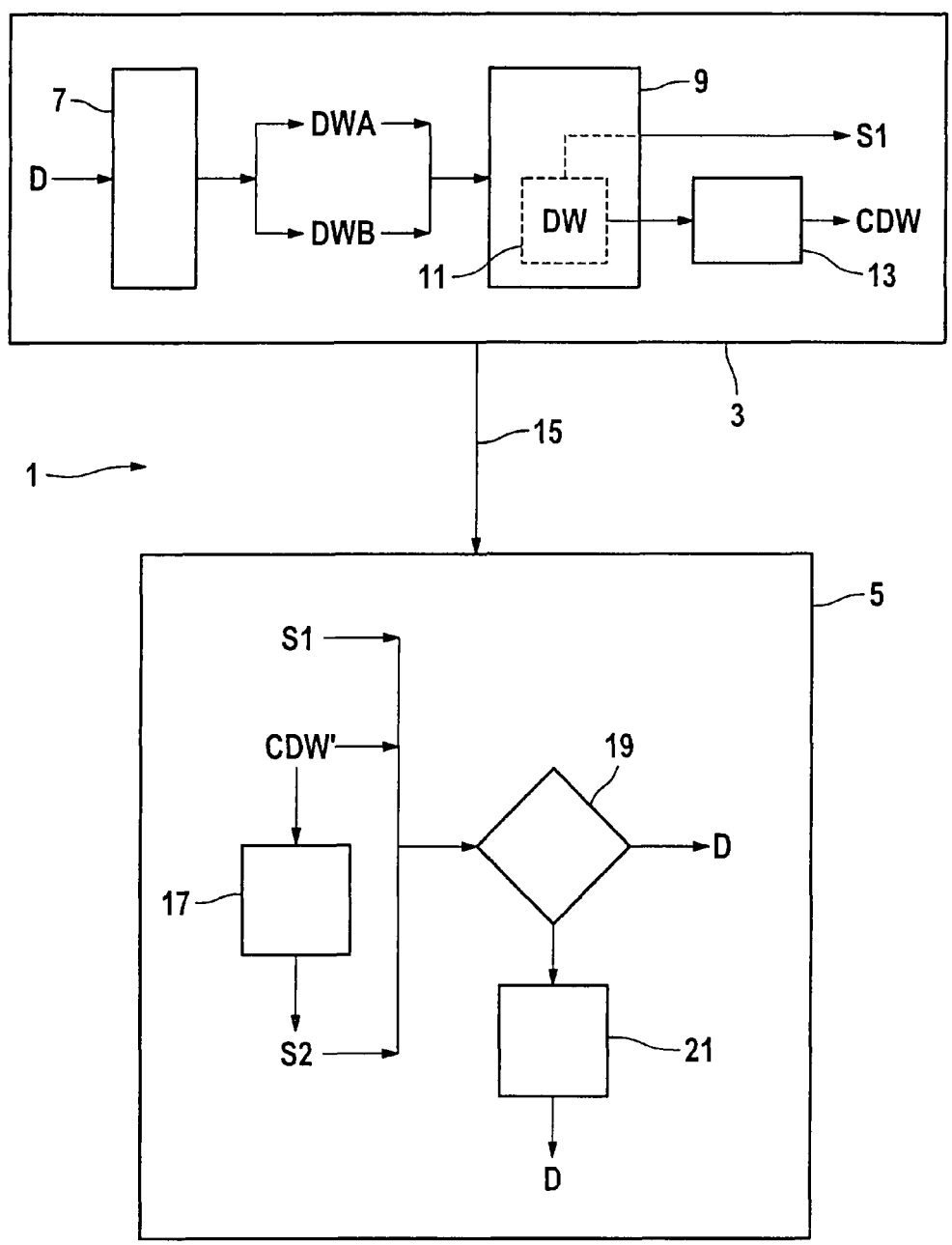
FIG. 1 is a schematic illustration of one example embodiment of a system according to the present invention, with consideration being given to individual steps of one example embodiment of a method according to the present invention.

The system 1 shown schematically in FIG. 1 includes a first station 3, provided as a transmitter, and a second station 5, provided as a receiver. Between first station 3 and second station 5, a datum D is to be transmitted as information. Datum D may be a number, an alphabetic character or any other character.

To carry out the method, datum D is to be encoded, datum D being assigned a data word DW consisting of bits, that is, two clearly distinguishable characters, for example ones and zeros. That data word may be selected in accordance with a predefinable coding rule 7 from two possible data words, a first data word DWA and a second data word DWB which is the inverse of the first data word. Coding rule 7 provides both a clear-cut encryption of the at least one datum D and a clear-cut decryption from one of the possible data words DWA or DWB to datum D.

A calculation 9 then takes place, in which a running digital sum is formed over the two data words DWA and DWB in each case. Data words DWA and DWB have a specific number z of characters, the first of the two possible bit values, for example a one, occurring a times within data word DWA or DWB. Accordingly, the second of the two possible bit values, for example the zero, occurs (z-a) times. The running digital sum is calculated from the difference between the first sum a for a total number of the first bit value and a second sum (z-a) for a total number of the second bit value within data words DWA and DWB. The running digital sum is in this case: (2a-z) or, depending on the definition of the running digital sum, the negative value thereof (z-2a).

At selection 11 of data word DW from the two possible data words DWA and DWB for datum D it is also possible to take into consideration a currently given running digital sum. The aim in so doing may be for first running digital sum S1 to have as small as possible a value in magnitude and, ideally, to be zero. It is from that perspective that either the first or the second assignable data word DWA or DWB is selected for datum D as the actual data word DW provided for further processing.

In addition, it is provided that the selected data word DW be converted by a modulation method 13 into a code data word CDW. In that operation, a bit of data word DW is in each case assigned a two-bit string formed from two different single-bit values. Possible modulation methods 13 that may be provided for the present method are so-called DPSK methods.

Transmission 15 of code data word CDW and of first running digital sum S1 from first station 3 to second station 5 of system 1 then takes place. That transmission may take place periodically. The possibility that a single bit of code data word CDW sent from first station 3 may be corrupted during transmission 15 cannot be ruled out. A code data word CDW' received by second station 5 may therefore differ from code data word CDW sent.

If a two-bit string has an error, it appears as a sequence of identical single-bit values, either as "00" or as "11". Such an erroneous two-bit string may have corresponded to the original error-free two-bit string "01" or "10". On demodulation 17, there are accordingly obtained two alternative demodulated data words of which precisely one may be identified, on the basis of its respective running digital sum, as the data word originally to be transmitted. The calculation of a respective second digital sum S2 for the two alternative demodulated data words is carried out in this case analogously to the calculation of first running digital sum S1.

Received code data word CDW' is subjected to an examination procedure 19. The latter examines whether that received code data word CDW' has a two-bit string with two identical single-bit values. Examination procedure 15 is carried out taking account of the fact that the original code data word CDW sent by first station 3 must have, in accordance with modulation method 13, two-bit strings with two different single-bit values. In addition, in the case where a single-bit error has occurred, there are obtained, as already explained, two alternative demodulated data words with correspondingly two different second digital sums S2. In examination procedure 19, first running digital sum S1 is compared with the respective second digital sums S2. That provides a further criterion for the exact identification of a single-bit error that has occurred.

Thus, two cases are obtained for received code data word CDW'. If, in accordance with a first case, it is found in examination procedure 19 that received code data word CDW' does not have a two-bit string with two identical single-bit values, then code data word CDW originally sent was sent correctly under that proviso between the two stations 3 and 5, and therefore received code data word CDW' corresponds to code data word CDW sent. Thus, it is possible to reconstruct from that correct received code data word CDW' by demodulation 17 data word DW and from that, taking into consideration coding rule 7, original datum D.

If it is found in examination procedure 19 that a two-bit string of received code data word CDW' has two identical single-bit values, then that two-bit string has an error or single-bit error. This means that a two-bit string of received code data word CDW' consists of two identical single-bit values, for example two zeros or ones. Clear-cut attribution of the error and hence a correction 21 of one of the two single-bit values of the erroneous two-bit string is carried out taking into consideration first running digital sum S1 which was also transmitted. First running digital sum S1 provides information on how often the two bit values have occurred within original data word DW. Taking first running digital sum S1 into consideration, it is possible to assign to the erroneous two-bit string of received code data word CDW' the correct original bit value of data word DW.

One possible way of implementing this example embodiment of the method will be described with reference to a concrete example. In accordance with the predefinable coding rule, a given datum D is assigned a first data word DWA="010010" and a second data word, which is the inverse thereof, DWB="101101". A value for a final bit of those two data words DWA and DWB indicates whether the data word has been selected from the set of inverted or non-inverted data words. If, for example, the currently given running digital sum was $S1_0=4$, and the first running digital sum is given by the sum of the currently given running digital sum and the running digital sum of the data word to be selected, first running digital sum S1 becomes, on consideration of first data word DWA, S1=2 and, on consideration of second data word DWB, S1=6. The calculation of the first running digital sum corresponds in the present case to the difference between the number of ones occurring and the number of zeros occurring. When those respective running digital sums so obtained are added to the currently given running digital sum $S1_0=4$, the respective values mentioned are obtained. In order, for example, to keep the magnitude of first running digital sum S1 as small as possible, first data word DWA is accordingly selected as data word DW and modulated to form a code data word CDW.

Assume there is provided as modulation method 13 in the present example a so-called second, modified DPSK method. According to that modified DPSK method, a single-bit value D(t) is assigned, in accordance with a generation rule: M(t)=D(t)#T(t), by way of an EXOR operator # between the carrier frequency T(t) and that single-bit value D(t), a two-bit string M(t) and thus a modulated signal. Without limitation of the generality, a bit value "0" of data word DW is assigned the two-bit string "10". The bit value "1" of data word DW is accordingly assigned the inverted two-bit string "01".

Calculation 9 of first running digital sum S1 would in this case result in S1=2, since the bit value "0" occurs four times and the bit value "1" occurs twice within data word DW, which gives a running digital sum of "−2" and, on addition to the mentioned currently given running digital sum $S1_0=4$, ultimately results in S1=2.

Owing to modulation method 13, there is obtained for data word DW a code data word CDW="10 01 10 10 01 10".

Alternatively, modulation method 13 may also be carried out with the so-called original DPSK method. In that case, a bit string of a code data word CDW is not changed if the subsequent bit value of data word DW is equal to zero. The bit string of code data word CDW is inverted, on the other hand, if the subsequent bit value of data word DW is equal to one.

Second station 5 receives, after transmission 15 of sent original code data word CDW, a corresponding code data word CDW' which may or may not have been corrupted by transmission 15. During examination procedure 19, that received code data word CDW' is examined to ascertain whether it has a two-bit string with two identical single-bit values, that is, a two-bit string consisting either of the single-bit values "00" or "11". If that is the case, within an erroneous two-bit string of received code data word CDW' the erroneous single bit is identified and corrected by examining the coding rule and first running digital sum S1.

The present example assumes that during transmission 15 the first single bit of the second two-bit string was corrupted, with the result that second station 5 has received the following code data word CDW'="10 11 10 10 01 10". On the basis of the predefined structure of code data word CDW sent and of code data word CDW' received, it is possible to recognize in a simple manner that the second two-bit string of code data word CDW' has been transmitted incorrectly.

Whether the first single bit of that second two-bit string has been corrupted, and therefore the original two-bit string is "01", or whether the second single bit of that two-bit string has been corrupted, and therefore the original two-bit string is "10", may be traced by taking first running digital sum S1 into consideration.

The erroneous code data word CDW'="10 11 10 10 01 10" may have originated from a string CDW'$_1$="10 10 10 10 01 10" or CDW'$_2$="10 01 10 10 01 10". Demodulation of CDW'$_1$ gives DW'$_1$="0 0 0 0 1 0" with a running digital sum of "−4" which, when added to the current given running digital sum S1$_0$=4, gives a second running digital sum S2=0. Demodulation of CDW'$_2$ gives DW'$_2$="0 1 0 0 1 0" with a running digital sum of "−2" which, when added to the current given running digital sum S1$_0$=4, gives a second running digital sum S2=2. On comparison of the respectively obtained second running digital sum S2 with the transmitted first running digital sum S1, it is apparent without any ambiguity that DW'$_2$ corresponds to the data word DW that was originally to be transmitted, and the error that occurred could accordingly be identified and corrected.

What is claimed is:

1. A method for error handling in transmission of a datum over a communications system, comprising:
    generating at least two data words consisting of bits for the datum in accordance with a predefined coding rule;
    selecting one of the at least two generated data words taking into consideration a running digital sum formed over the corresponding data word, wherein the running digital sum of the selected data word is used for formation of a first running digital sum;
    converting the selected data word by a modulation method into a code data word, wherein each bit of the selected data word is assigned a two-bit string with two different single-bit values;
    transmitting the code data word and the first running digital sum;
    analyzing the received code data word to ascertain an error, wherein an error is determined if a two-bit string with two identical single-bit values occurs in the received code data word; and
    if an error is determined, correcting the error using at least the first running digital sum.

2. The method as recited in claim 1, wherein the selection of one of the at least two generated data words is subject to the condition that the first running digital sum has as small a magnitude as possible.

3. The method as recited in claim 1, wherein the at least two data words generated in accordance with the predefined coding rule are inverse of each other.

4. The method as recited in claim 1, wherein an erroneous single bit of the received code data word is identified and corrected by taking into consideration the predefined coding rule.

5. The method as recited in claim 1, further comprising:
    if an erroneous two-bit string with two identical single-bit values occurs in the received code data word, converting the received code data word into at least two data words by a demodulation method corresponding to the modulation method;
    calculating a running digital sum for the at least two data words formed by the demodulation method, wherein the running digital sum is used for the formation of a second running digital sum for each of the at least two data words formed by the demodulation method; and
    comparing each of the second running digital sums with the received first running digital sum to identify and correct the error.

6. The method as recited in claim 1, wherein the selected data word is modulated by a first differential phase shift keying method by: (a) not changing a bit string of the code data word if a following bit value of the selected data word has a first of two possible bit values; and (b) inverting the bit string of the code data word if the following bit value of the selected data word has a second of two possible bit values.

7. The method as recited in claim 1, wherein the selected data word is modulated by a second differential phase shift keying method by: (a) assigning to the two-bit string in the code data word for a bit to be modulated in the selected data word a first of two possible bit strings, if the bit to be modulated in the selected data word has a zero as the bit value; and (b) assigning to the two-bit string in the code data word for a bit to be modulated in the selected data word a second of two possible bit strings, if the bit to be modulated in the selected data word has a one as the bit value.

8. The method as recited in claim 5, wherein the code data word and the first running digital sum are sent by a first station and received by at least one second station, and wherein the second running digital sum is calculated by the at least one second station, and wherein an erroneous bit of the code data word is recognized and corrected by the at least one second station.

9. A system configured to perform error handling for a datum transmitted between at least two stations, comprising:
    a first station configured to: a) generate at least two data words consisting of bits for the datum in accordance with a predefined coding rule; b) select one of the at least two generated data words taking into consideration a running digital sum formed over the corresponding data word, wherein the running digital sum of the selected data word is used for formation of a first running digital sum; c) convert the selected data word by a modulation method into a code data word, wherein each bit of the selected data word is assigned a two-bit string with two different single-bit values, and d) transmit the code data word and the first running digital sum;
    a second station configured to: a) receive the code data word and the first running digital sum transmitted by the first station; b) analyze the received code data word to ascertain an error, wherein an error is determined if a two-bit string with two identical single-bit values occurs in the received code data word; and c) if an error is determined, correct the error using at least the first running digital sum.

10. A computer-readable storage medium storing a computer program having program codes which, when executed on a computer, controls a method for error handling in transmission of a datum over a communications system, the method comprising:
    generating at least two data words consisting of bits for the datum in accordance with a predefined coding rule;
    selecting one of the at least two generated data words taking into consideration a running digital sum formed over the corresponding data word, wherein the running digital sum of the selected data word is used for formation of a first running digital sum;

converting the selected data word by a modulation method into a code data word, wherein each bit of the selected data word is assigned a two-bit string with two different single-bit values;

transmitting the code data word and the first running digital sum;

analyzing the received code data word to ascertain an error, wherein an error is determined if a two-bit string with two identical single-bit values occurs in the received code data word; and if an error is determined, correcting the error using at least the first running digital sum.

* * * * *